(12) United States Patent
Mulloy

(10) Patent No.: US 9,784,397 B2
(45) Date of Patent: Oct. 10, 2017

(54) SYSTEMS FOR VACUUM SEALED ACCESS PASSAGE

(71) Applicant: HONEYWELL INTERNATIONAL INC., Morristown, NJ (US)

(72) Inventor: Patrick S. Mulloy, Chandler, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 293 days.

(21) Appl. No.: 14/686,046

(22) Filed: Apr. 14, 2015

(65) Prior Publication Data
US 2016/0305594 A1    Oct. 20, 2016

(51) Int. Cl.
| | |
|---|---|
| F16L 55/10 | (2006.01) |
| F16L 45/00 | (2006.01) |
| B65D 90/10 | (2006.01) |
| F16K 24/00 | (2006.01) |
| F16K 27/08 | (2006.01) |

(52) U.S. Cl.
CPC .............. *F16L 45/00* (2013.01); *B65D 90/10* (2013.01); *F16K 24/00* (2013.01); *F16K 27/08* (2013.01)

(58) Field of Classification Search
CPC . F16L 55/1141; F16L 55/1152; B65D 43/021; B65D 43/0256
USPC ....... 138/89, 96 R, 96 T; 220/324, 323, 801, 220/802
See application file for complete search history.

(56) References Cited

U.S. PATENT DOCUMENTS

| | | | | |
|---|---|---|---|---|
| 2,583,162 A * | 1/1952 | Verel | ................... | B65D 41/023 |
| | | | | 215/354 |
| 3,358,869 A * | 12/1967 | Palmer | ............... | F16L 55/1141 |
| | | | | 138/89 |
| 3,537,474 A | 11/1970 | Rohrer | | |
| 3,743,131 A * | 7/1973 | Croyle | ................. | B65D 43/022 |
| | | | | 220/789 |
| 3,749,277 A * | 7/1973 | Kinney | ............... | B65D 43/021 |
| | | | | 215/321 |
| 4,044,918 A | 8/1977 | Alton | | |
| 4,674,644 A * | 6/1987 | Jacobs | ................... | B65D 41/22 |
| | | | | 215/320 |
| 5,188,402 A | 2/1993 | Colgate et al. | | |
| 5,251,770 A * | 10/1993 | Bartley | ............. | B65D 43/0256 |
| | | | | 215/270 |

(Continued)

FOREIGN PATENT DOCUMENTS

| | | |
|---|---|---|
| CA | 2798864 A1 | 2/2013 |
| CN | 201399458 Y | 2/2010 |

(Continued)

OTHER PUBLICATIONS

Extended EP Search Report for Application No. 16163944.8-1662 dated Aug.18, 2016.

*Primary Examiner* — Patrick F Brinson
(74) *Attorney, Agent, or Firm* — Lorenz & Kopf, LLP

(57) ABSTRACT

Apparatus are provided for an access system for a passage defined in a component. The passage is surrounded by a flange, and the access system comprises a plug adapted to be coupled to the flange of the component to seal the passage. The plug includes a sidewall and an overhang coupled to the sidewall. The overhang is configured to substantially surround at least a portion of the flange and the plug is movable between a first, unsealed position and a second, sealed position upon the application of a force.

17 Claims, 4 Drawing Sheets

(56) References Cited

U.S. PATENT DOCUMENTS

| | | | | |
|---|---|---|---|---|
| 5,427,266 | A * | 6/1995 | Yun | B65D 25/54 |
| | | | | 116/200 |
| 6,834,770 | B2 * | 12/2004 | Lo | B65D 90/545 |
| | | | | 138/89 |
| 7,909,204 | B2 * | 3/2011 | Antal, Sr. | B65D 51/18 |
| | | | | 220/254.1 |
| 8,851,123 | B2 * | 10/2014 | Le Gall | F16L 55/1152 |
| | | | | 138/89 |
| 9,051,095 | B2 * | 6/2015 | Antal, Sr. | B65D 43/0212 |
| 2003/0093980 | A1 | 5/2003 | Liao et al. | |
| 2005/0010177 | A1 | 1/2005 | Tsai | |
| 2010/0176132 | A1 | 7/2010 | Canty et al. | |
| 2012/0103995 | A1 * | 5/2012 | Le Gall | F16L 55/1152 |
| | | | | 220/378 |
| 2014/0039599 | A1 | 2/2014 | Berreklouw | |
| 2014/0221721 | A1 | 8/2014 | Bermudez et al. | |

FOREIGN PATENT DOCUMENTS

| | | |
|---|---|---|
| GB | 2461873 A | 1/2010 |
| JP | 2006158603 A | 6/2006 |
| WO | 03015851 A1 | 2/2003 |

* cited by examiner

SYSTEMS FOR VACUUM SEALED ACCESS PASSAGE

TECHNICAL FIELD

The present disclosure generally relates to access systems for gaining entry into a passage, and more particularly relates to an access system having a vacuum sealed access passage.

BACKGROUND

Certain components require access after installation to enable repair and/or maintenance of the component. For example, in a mobile platform, certain plenums and inlet ducts require access to components located within or surrounded by the duct for maintenance. Typically, access is provided through an access panel, which can be sealed with an elastomeric gasket. The use of an elastomeric gasket, however, may be undesirable due to certain regulatory standards for containment.

Accordingly, it is desirable to provide improved access systems for gaining entry into passages of components, such as passages defined in ducts, which do not require an elastomeric gasket. Furthermore, other desirable features and characteristics of the present invention will become apparent from the subsequent detailed description and the appended claims, taken in conjunction with the accompanying drawings and the foregoing technical field and background.

SUMMARY

According to various embodiments, an access system for a passage defined in a component is provided. The passage is surrounded by a flange, and the access system comprises a plug adapted to be coupled to the flange of the component to seal the passage. The plug includes a sidewall and an overhang coupled to the sidewall. The overhang is configured to substantially surround at least a portion of the flange and the plug is movable between a first, unsealed position and a second, sealed position upon the application of a force.

A duct is provided, according to various embodiments. The duct comprises a body defining a passage and a flange. The flange extends substantially about a perimeter of the passage and defines a first bore. The duct further comprises an access system for sealing the passage. The access system comprises a plug coupled to the flange for sealing the passage. The plug includes a base and a sidewall, and the sidewall defines a second bore. The access system also comprises a fastener received within the first bore and the second bore to couple the plug to the flange. The plug is movable between a first, unsealed position and a second, sealed position upon the application of a force to seal the passage.

Also provided according to various embodiments is a duct. The duct comprises a body defining a passage and a flange. The flange extends outwardly from the body about a circumference of the passage. The duct also comprises an access system for sealing the passage. The access system comprises a plug coupled to the flange for sealing the passage. The plug includes a sidewall that extends radially outward from a base, and the base is received at least partially within the passage. An overhang is coupled to the sidewall to extend about a perimeter of the flange. The plug is movable between a first, unsealed position and a second, sealed position upon the application of a force to seal the passage.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any number of components requiring access to items within or surrounded by the component, and that the portion of the duct system described herein is merely one exemplary embodiment for an access system, which includes a vacuum sealed access passage, of the present disclosure. It should be noted that many alternative or additional functional relationships or physical connections may be present in an embodiment of the present disclosure.

Figure 1:
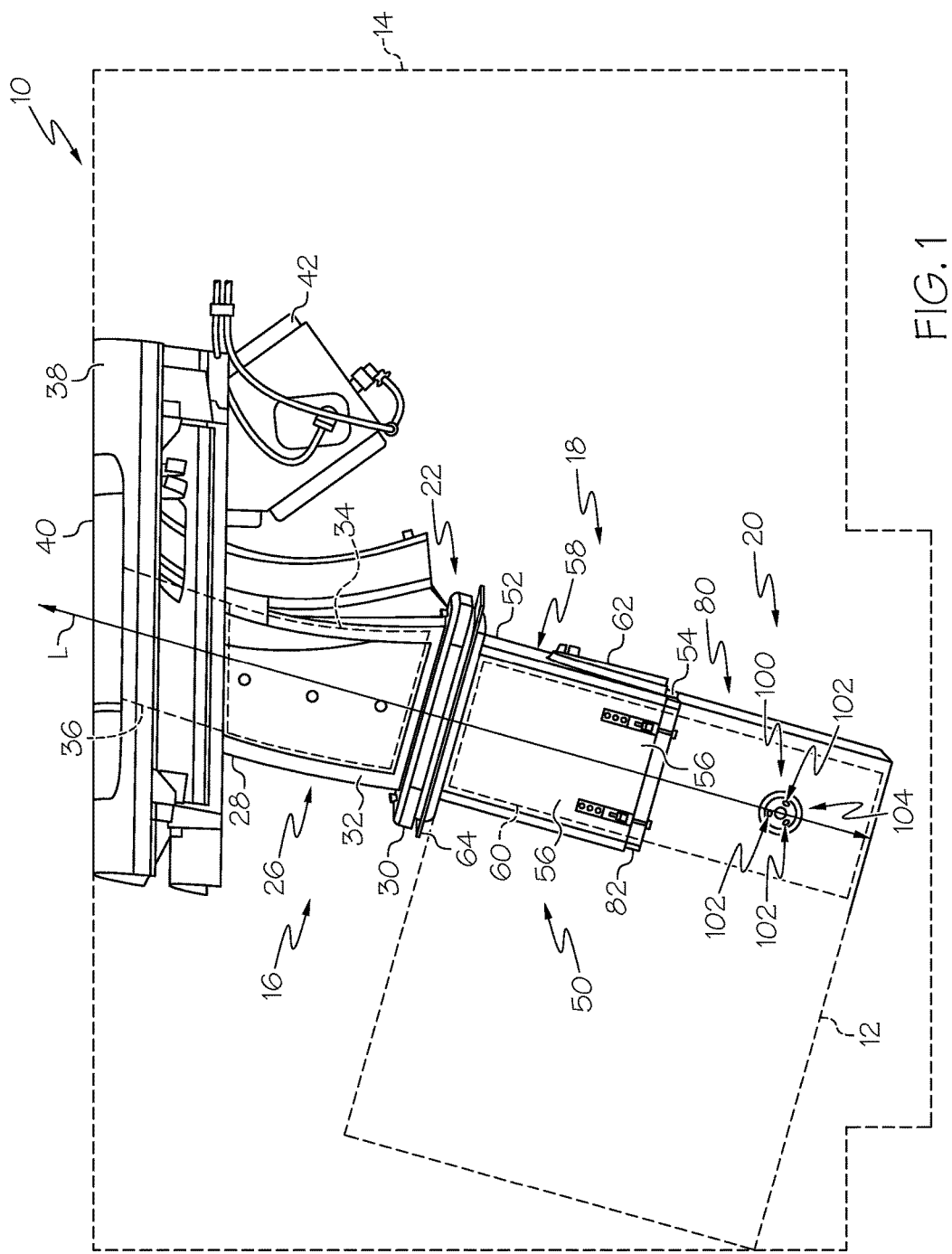
FIG. 1 is a schematic perspective illustration of a duct system that includes an access system having a vacuum sealed access passage in accordance with various embodiments.

With reference to FIG. 1, a duct system 10 is shown. The duct system 10 can be an inlet plenum associated with or in fluid communication with an auxiliary power unit (APU) 12, which can provide auxiliary power to a vehicle 14 as known to one skilled in the art. In one example, the vehicle 14 is an aircraft, but the vehicle 14 can be any suitable vehicle, such as a marine vessel, bus, spacecraft, etc. Further, it should be noted that the use of the duct system 10 with the APU 12 and vehicle 14 is merely exemplary, as the duct system 10 can be employed with any suitable fluid ducting system. The duct system 10 includes a first duct or inlet duct 16, a second duct or plenum 18, a third duct or lower plenum 20 and a joint 22 between the inlet duct 16 and the plenum 18. As will be discussed in greater detail herein, one or more of the inlet duct 16, the plenum 18 and the lower plenum 20 includes an access system 100. Although the figures shown herein depict an example with certain arrangements of elements, additional intervening elements, devices, features, or components may be present in an actual embodiment. It should also be understood that FIG. 1 is merely illustrative and may not be drawn to scale.

The inlet duct 16 includes a body 26, which defines a first end 28 and a second end 30. The body 26 can be composed of any suitable material, such as a metal or polymer. In one example, the body 26 is composed of a composite polymeric material. The body 26 includes a plurality of sides 32 between the first end 28 and the second end 30, which cooperate to define a duct or passage 34 through the body 26 to enable fluid to flow through the inlet duct 16. In one example, the plurality of sides 32 are arranged to define a rectangular duct or passage 34, however, the plurality of sides 32 can be arranged to form any desired polygonal shape. Further, the body 26 need not include a plurality of sides 32, but can also be annular, circular or cylindrical, with a single side. Thus, the inlet duct 16 illustrated herein is merely exemplary.

The first end 28 of the body 26 is coupled to an inlet 36. As the inlet 36 is generally known to those skilled in the art, the inlet 36 will not be discussed in great detail herein. Briefly, however, the inlet 36 can be defined through a skin structure 38 of the vehicle 14, such that fluid surrounding the vehicle 14 can be drawn in through the inlet 36. In various embodiments, a door 40 can cover the inlet 36. The door 40 is moveable between an opened and closed position (and positions therebetween) by an actuator 42 to open and close the inlet 36. With the door 40 in the opened position, fluid surrounding the vehicle 14 flows through the inlet 36, into the passage 34 and to the plenum 18 and lower plenum 20.

The second end 30 of the body 26 is coupled to the joint 22. The joint 22 generally enables the movement of the plenum 18 relative to the inlet duct 16 at the joint 22. The plenum 18 is coupled at the joint 22, and the lower plenum 20 is coupled to the plenum 18. The plenum 18 and the lower plenum 20 receive the fluid from the inlet duct 16. The plenum 18 has a body 50, which defines a first end 52 and a second end 54. The body 50 can be composed of any suitable material, such as a metal or polymer. In one example, the body 50 is composed of a composite polymeric material. The body 50 includes a plurality of first sides 56 and a plurality of second sides 58 between the first end 52 and the second end 54. The plurality of first sides 56 and the plurality of second sides 58 cooperate to define a chamber 60. In one example, the plurality of first sides 56 have a slight angle or curvature from the first end 52 to the second end 54 such that the body 50 has a greater width at the second end 54 than the first end 52, when measured in a direction substantially perpendicular to a longitudinal axis L of the duct system 10. Each of the plurality of second sides 58 defines an aperture 62. The aperture 62 is substantially semi-circular. It should be noted that while the plenum 18 is described and illustrated herein as including both the plurality of first sides 56 and the plurality of second sides 58, the body 50 of the plenum 18 can have any number of sides and can have any suitable shape. Thus, the plenum 18 illustrated herein is merely exemplary.

With reference to FIG. 1 the second end 54 of the body 50 can be coupled to the lower plenum 20 to complete the plenum 18 and/or can be coupled to structure associated with the APU 12 as is generally known. The first end 52 of the body 50 includes an outwardly extending flange 64. The flange 64 can be integrally formed from a terminal portion of one or more of the plurality of first sides 56 and the plurality of second sides 58 of the body 50. In this example, the flange 64 extends outwardly from the first end 52 of the body 50 at about a 90 degree angle, however, the flange 64 can extend outwardly from the first end 52 at any suitable angle. The flange 64 couples the first end 52 of the body 50 to the inlet duct 16 at the joint 22, thereby enabling fluid to flow into the plenum 18.

Figure 2:
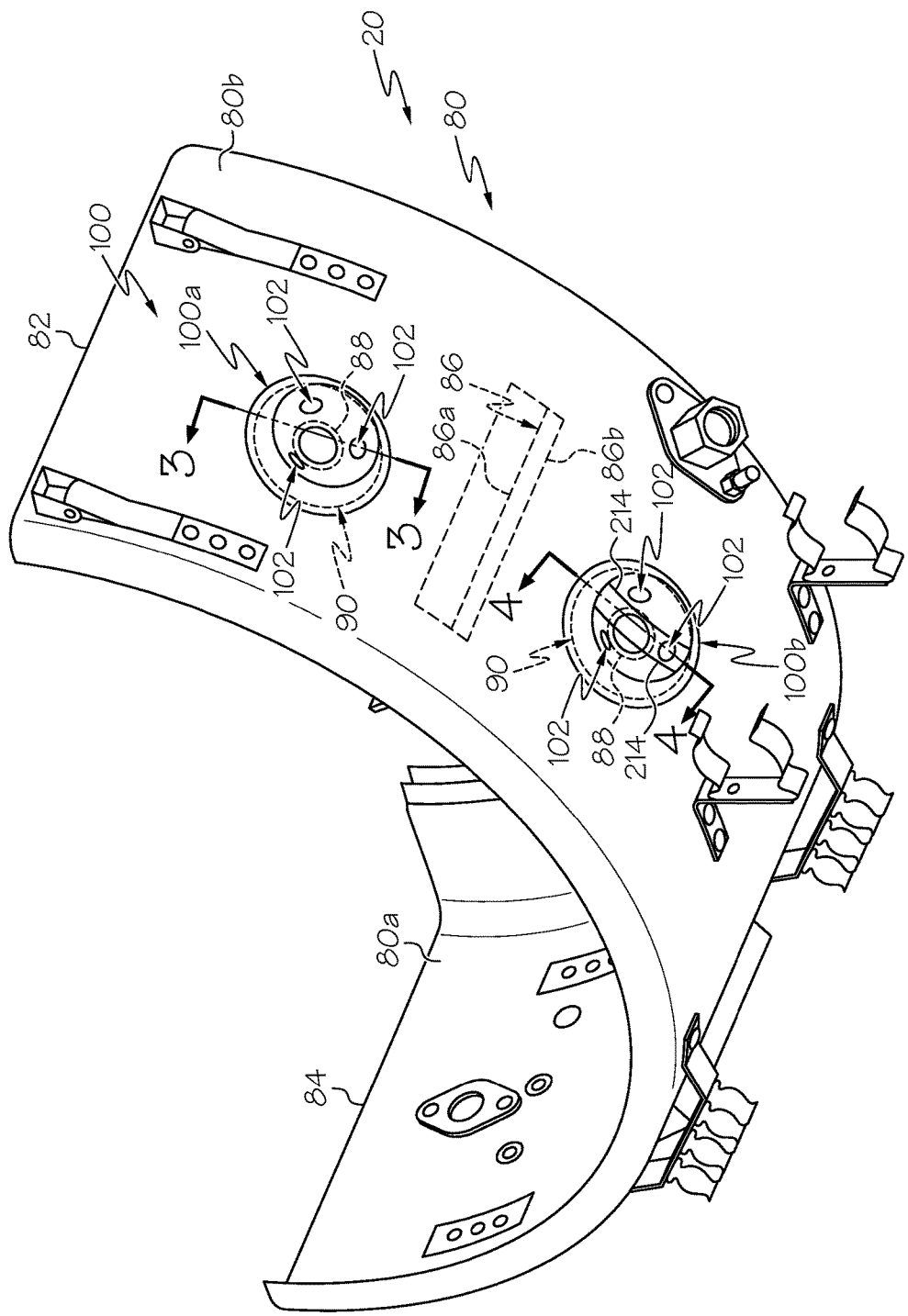
FIG. 2 is a perspective illustration of a portion of the duct system of FIG. 1, which includes the access system having a vacuum sealed access passage in accordance with various embodiments.

With reference to FIGS. 1 and 2, the lower plenum 20 is generally semi-circular in shape. It should be noted that the lower plenum 20 can have any desired shape to cooperate with the APU 12, and further, the lower plenum 20 need not be separate from the plenum 18, but can be integrally formed. The lower plenum 20 includes a body 80 having a first end 82 and a second end 84. The body 80 can be composed of any suitable material, such as a metal or polymer. In one example, the body 80 is composed of a composite polymeric material. The first end 82 of the body 80 can be coupled to the first side 56 at the second end 54, and the second end 84 can be coupled to the other first side 56 at the second 54 to couple the lower plenum 20 to the plenum 18. The lower plenum 20 is coupled to the plenum 18 via any suitable technique, such as one or more mechanical fasteners, straps, etc. as is generally known. The plenum 18 and the lower plenum 20 can cooperate to extend about 360 degrees about an intake of the APU 12. Generally, the body 80 has a curve or a radius between the first end 82 and the second end 84 to define the semi-circular shape of the lower plenum 20. In one example, one or more of the access systems 100 are coupled to the body 80 between the first end 82 and the second end 84. It should also be noted that the body 80 of the lower plenum 20 can include various other components, such as hose clamps, hose and wire supports, etc. in addition to the one or more access systems 100.

Generally, the one or more access systems 100 are coupled to the body 80 of the lower plenum 20 to enable access to one or more components or features covered by or surrounded by the body 80 of the lower plenum 20. For example, a baffle 86 can be coupled to an interior surface 80a of the body 80, so as to not be visible or accessible from an exterior surface 80b of the body 80. In this example, the one or more access systems 100 can comprise a first access system 100a on a first side 86a of the baffle 86, and a second access system 100b on a second side 86b of the baffle 86. The first access system 100a and the second access system 100b permit access through the body 80 from the exterior surface 80b to the interior surface 80a to enable both sides of the baffle 86 to be cleaned or maintained. In addition, it should be noted that while two access systems 100a, 100b are described and illustrated herein, the lower plenum 20, plenum 18 and the inlet duct 16 can include one or more access systems as desired to enable access to components disposed within and surrounded by one or more of the lower plenum 20, plenum 18 and inlet duct 16.

For each of the one or more access systems 100 coupled to the body 80, the body 80 of the lower plenum 20 can define an aperture or passage 88 and a flange 90. The passage 88 can be defined through the body 80 from the exterior surface 80b to the interior surface 80a, and can be substantially circular. The passage 88 can be sized to enable suitable access into the interior of the lower plenum 20. In one example, with reference to FIG. 3, the passage 88 can have a diameter of about 3.0 inches (in.) to about 8.0 inches (in.). As a further example, the passage 88 can have a diameter of about 6.0 inches (in.). The passage 88 can be vacuum sealed by the access system 100 associated with the passage 88.

The flange 90 can be defined by the body 80 of the lower plenum 20, and can extend outwardly from the exterior surface 80b of the body 80. It should be noted that while the flange 90 is illustrated herein as being integrally formed with the body 80, the flange 90 can be separate and discrete from the body 80 and can be coupled to the body 80 via a suitable technique, such as ultrasonic welding, mechanical fasteners, etc. In the example of the flange 90 integrally formed with the body 80, the flange 90 can be formed as a composite material and integrally formed with the body 80 as known to those skilled in the art.

Figure 3:
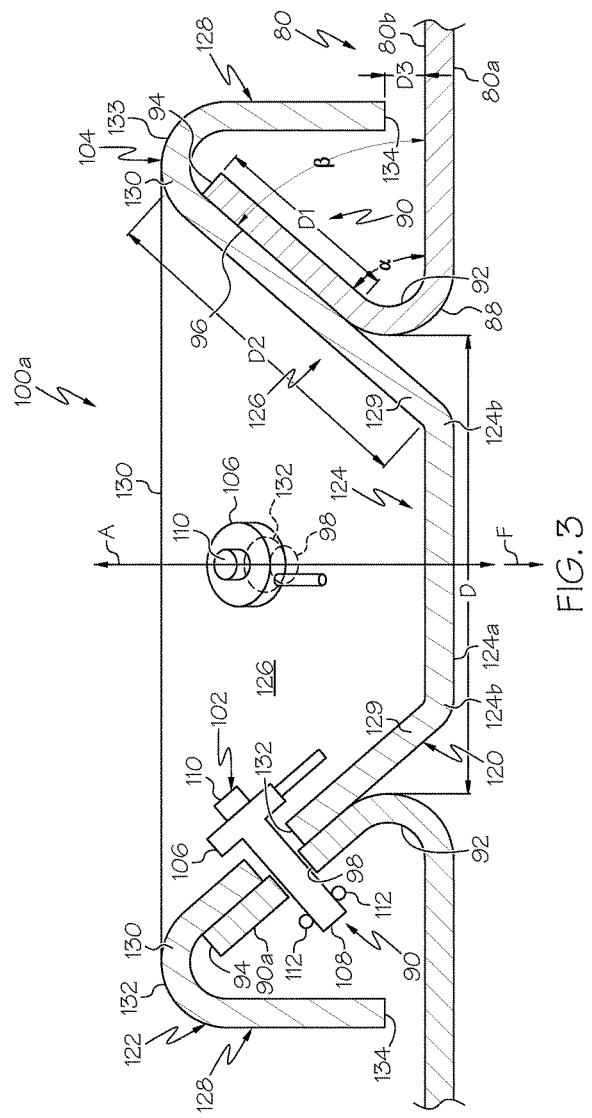
FIG. 3 is a cross-sectional view of one of the access systems of FIG. 2, taken along line 3-3 of FIG. 2, which includes a vacuum sealed access passage in accordance with various embodiments.

In one example, the flange 90 substantially surrounds a perimeter or circumference of the passage 88. It should be noted that while the flange 90 is illustrated in FIG. 2 as substantially surrounding the entirety of the perimeter or circumference of the passage 88, the flange 90 can extend about only a portion of the passage 88, if desired. Generally, the flange 90 extends about the passage 88 to provide a sealing surface for a respective one of the one or more access systems 100. With reference to FIG. 3, the flange 90 includes a first end 92 and a second end 94. The first end 92 can be offset from the second end 94. In one example, the flange 90 is substantially conical, and the second end 94 can extend at an angle α relative to the exterior surface 80b of the body 80. In one example, the angle α can be about 60 degrees. The flange 90 can define a sealing surface 96 between the first end 92 and the second end 94. The sealing surface 96 contacts a respective one of the access systems 100 to provide a contact surface for the respective one of the access systems 100 to seal against. In one example, the sealing surface 96 is substantially smooth, and extends for a distance D1 between about 1.0 inches (in.) to about 1.5 inches (in.). Generally, the distance D1 of the sealing surface 96 can be substantially uniform about the perimeter of the flange 90.

The flange 90 can include at least one bore 98. In one example, the flange 90 can include three bores 98, which can be spaced substantially equally apart about the perimeter or circumference of the flange 90. Thus, the flange 90 can be substantially asymmetric with respect to an axis A that extends through the passage 88, while the passage 88 is symmetric with respect to the axis A. It should be noted that although the flange 90 is described and illustrated herein as being substantially asymmetric with respect to the axis A, it should be noted that the flange 90 can be symmetric if desired. The bores 98 can generally be formed along the flange 90 between the first end 92 and the second end 94 of the flange 90. Each of the bores 98 can receive a fastener 102 to couple a respective one of the access systems 100 to the flange 90. It should be noted that the use of the bores 98 and the fasteners 102 is merely exemplary, as the access systems 100 can be releasably coupled to the flange 90 through any suitable heat resilient fastening technique as known to those skilled in the art. Further, although the bores 98 are illustrated herein as being substantially evenly spaced about the perimeter or circumference of the flange 90, one or more of the bores 98 can be offset relative to each other, both radially and circumferentially, if desired. Moreover, the number of bores 98 and the number of fasteners 102 can vary depending upon the size of the flange 90.

With continued reference to FIG. 3, the first access system 100a includes the one or more fasteners 102 and a plug 104. In one example, the one or more fasteners 102 comprise three fasteners 102, each received in a respective one of the bores 98 (FIG. 2). The fasteners 102 can comprise any suitable heat resilient mechanical fastening device that is able to be fastened and unfastened from the same side such that access to a back side 90a of the flange 90 is not necessary. For example, the fasteners 102 can include, but are not limited to, a ball lock push pin or tether pin. It should be noted that the fasteners 102 can comprise fasteners 102 that require access to the back side 90a of the flange 90 to fasten and unfasten the fastener 102 (e.g. a nut and bolt), if desired. As the fastener 102 can be known to one skilled in the art, the fastener 102 will not be discussed in great detail herein. Briefly, in the example of a ball lock push pin, the fastener 102 includes a head 106 and a shaft 108. An actuator 110 is movable relative to the head 106 within the shaft 108 to deploy one or more balls 112 from the shaft 108. The balls 112 are dimensioned such that the circumference of the shaft 108 with the balls 112 deployed is greater than or larger than a diameter of the bore 98 to fasten or lock the fastener 102 relative to the bore 98. While the fasteners 102 are illustrated herein as comprising ball lock push pins with a ring handle coupled to the head 106, the fasteners 102 can have a recessed or flat style head 106, if desired.

The fasteners 102 couple or secure the plug 104 to the flange 90. As will be discussed further herein, the plug 104 is influenced by a vacuum or negative pressure source to move the plug 104 from a first, unsealed position to a second, sealed position. Stated another way, the plug 104 can be movable into the second, sealed position, in which the plug 104 seals against the sealing surface 96 via a vacuum or negative pressure. The fasteners 102 couple the plug 104 to the flange 90 such that the plug 104 remains coupled to the flange 90 in the first, unsealed position. The plug 104 is sized and shaped to have a corresponding fit with the flange 90. In other words, a first side 120 of the plug 104 is sized and shaped to fit or mate against the sealing surface 96 of the flange 90 and to be at least partially received within the passage 88. Generally, the first side 120 of the plug 104 is sized and shaped to fit against the flange 90 without forming an interference fit with the flange 90.

The plug 104 can be composed of any suitable heat resilient or heat resistant material that can be movable by a source of a vacuum or negative pressure. Generally, the source of vacuum can apply a force F directed inward toward the interior surface 80a and interior of the body 80 of the lower plenum 20. In one example, the source of vacuum can be the APU 12, which can produce a vacuum of about 0.5 pounds per square inch (psi) in certain operating conditions. Thus, the plug 104 can be composed of a heat resistant or heat resilient metal, metal alloy, polymer or composite material. For example, the plug 104 can be composed of 3-5 pre-preg plies of a composite material with fiberglass, carbon fiber or graphite fiber. In the example of the plug 104 being formed of a composite material, the plug 104 can be formed by a manual layup of the pre-preg composite plies, through resin transfer molding, or through compression molding, as known to those skilled in the art. As a further example, the plug 104 can be composed of a thin, lightweight heat resistant metal, which can be formed, shaped or cast into a shape that corresponds to the shape of the flange 90. Thus, the plug 104 can also be asymmetric with respect to the axis A. It should be noted, however, that the plug 104 can be symmetric with respect to the axis A, if desired.

The plug 104 includes the first side 120 that mates against the flange 90 and a second side 122, which is opposite the first side 120. In this example, the plug 104 is substantially conical to correspond with the shape of the flange 90, and includes a base 124, a sidewall 126 and an overhang 128. It should be noted that while the plug 104 is described and illustrated herein as being a single piece with substantially uniform thickness, the plug 104 can be composed of multiple pieces, which can be coupled together via any suitable technique, such as welding, mechanical fasteners, adhesives, etc. Moreover, one or more of the base 124, sidewall 126 and the overhang 128 can have a material thickness that is different than another of the base 124, the sidewall 126 and the overhang 128.

The base 124 is substantially circular and has a diameter, which is smaller than the diameter D of the passage 88, such that the base 124 can be received within a portion of the passage 88. Generally, the plug 104 is shaped such that the base 124 does not extend beyond the interior surface 80a. Rather, the plug 104 can be shaped such that a distalmost end 124a of the base 124 is planar to the interior surface 80a surrounding the passage 88. It should be noted that the distalmost end 124a of the base 124 can be spaced apart from a plane that includes the interior surface 80a about the passage 88 in a direction towards the exterior surface 80b, if desired.

The sidewall 126 is coupled to a perimeter or circumference 124b of the base 124 so as to extend radially outward from the base 124. The sidewall 126 includes a first end 129, a second end 130 and one or more bores 132 defined through the sidewall 126 generally between the first end 129 and the second end 130. The first end 129 is coupled to the perimeter or circumference 124b of the base 124, and the second end 130 is coupled to the overhang 128. The first end 129 can be offset from the second end 130. In one example, the second end 130 can extend at an angle θ relative to the exterior surface 80b of the body 80. Generally, the angle θ can be about equal to the angle α to enable the corresponding or mating fit between the plug 104 and the flange 90. Thus, in one example, the angle β can be about 60 degrees. The sidewall 126 can extend for a distance D2, which can be greater than the distance D1 of the sealing surface 96 of the flange 90. The greater distance D2 facilitates the placement of the overhang 128 about an outer circumference of the flange 90, as will be discussed below. The first surface 120 of the plug 104 at the sidewall 126 cooperates with the sealing surface 96 to form a seal about the passage 88 when the plug 104 is in the second, sealed position.

The one or more bores 132 can correspond to the number of bores 98 associated with the flange 90. Thus, in this example, the sidewall 126 can define three bores 132. The bores 132 can receive a respective one of the fasteners 102 to couple the plug 104 to the flange 90. The bores 132 can be substantially coaxially aligned with the bores 98 when the plug 104 is coupled to the flange 90 in the first, unsealed position. The bores 132 can have a diameter that is slightly larger than a diameter of the bores 98 and a diameter of the fastener 102 to enable the plug 104 to move from the first, unsealed position to the second, sealed position upon the application of the vacuum or negative pressure from the source. Alternatively, the bores 98 can have a diameter that is larger than the bores 132 and the diameter of fastener 102 to permit the movement of the plug 104 relative to the flange 90. Generally, one of the bores 132 and bores 98 will have a different, larger diameter than a diameter of the fastener 102 and a diameter of the other of the bores 132 and the bores 98 to enable the movement of the plug 104. When the plug 104 is in the second, sealed position, a central axis of the bores 132 can be offset from a central axis of the bores 98. It should be noted that while the bores 132 and the bores 98 as illustrated herein as being defined through the plug 104 and flange 90 along an axis transverse to or that intersects the exterior surface 80b of the body 80, the bores 132 and the bores 98 can be orientated in any desired orientation to receive a suitable mechanism or fastening device to couple the plug 104 to the flange 90. For example, the bores 132 and bores 98 can be orientated to receive a fastener, such as a nut and bolt, spring loaded push pin, etc., that applies a perpendicular force to the plug 104 (i.e. a force perpendicular to the exterior surface 80b or a force that extends along the axis A) to hold the plug 104 in the second, sealed position at all times.

The overhang 128 extends radially inward from the second end 130 of the sidewall 126. Stated another way, the overhang 128 is coupled about a perimeter or circumference of the sidewall 126 at the second end 130 and extends from the second end 130 in a direction towards the exterior surface 80b of the body 80. In one example, the overhang 128 includes a first end 133 and a second end 134. The first end 133 is coupled to the second end 130 of the sidewall 126 so as to extend about the perimeter or circumference of the sidewall 126. The second end 134 extends inward from the first end 133 towards the exterior surface 80b of the body 80. Generally, the second end 134 is spaced a distance D3 from the exterior surface 80b of the body 80. The distance D3 is sized to prevent an interference between the plug 104 and the flange 90. Generally, the overhang 128 is dimensioned to extend towards the exterior surface 80b without contacting or interfering with the fasteners 102. It should be noted, however, that the overhang 128 can include one or more bores, to receive one or more of the fasteners 102, such that the fasteners 102 pass through the sidewall 126, the flange 90 and the overhang 128, if desired. The overhang 128 also creates a more tortuous path in case of an event requiring containment.

Figure 4:
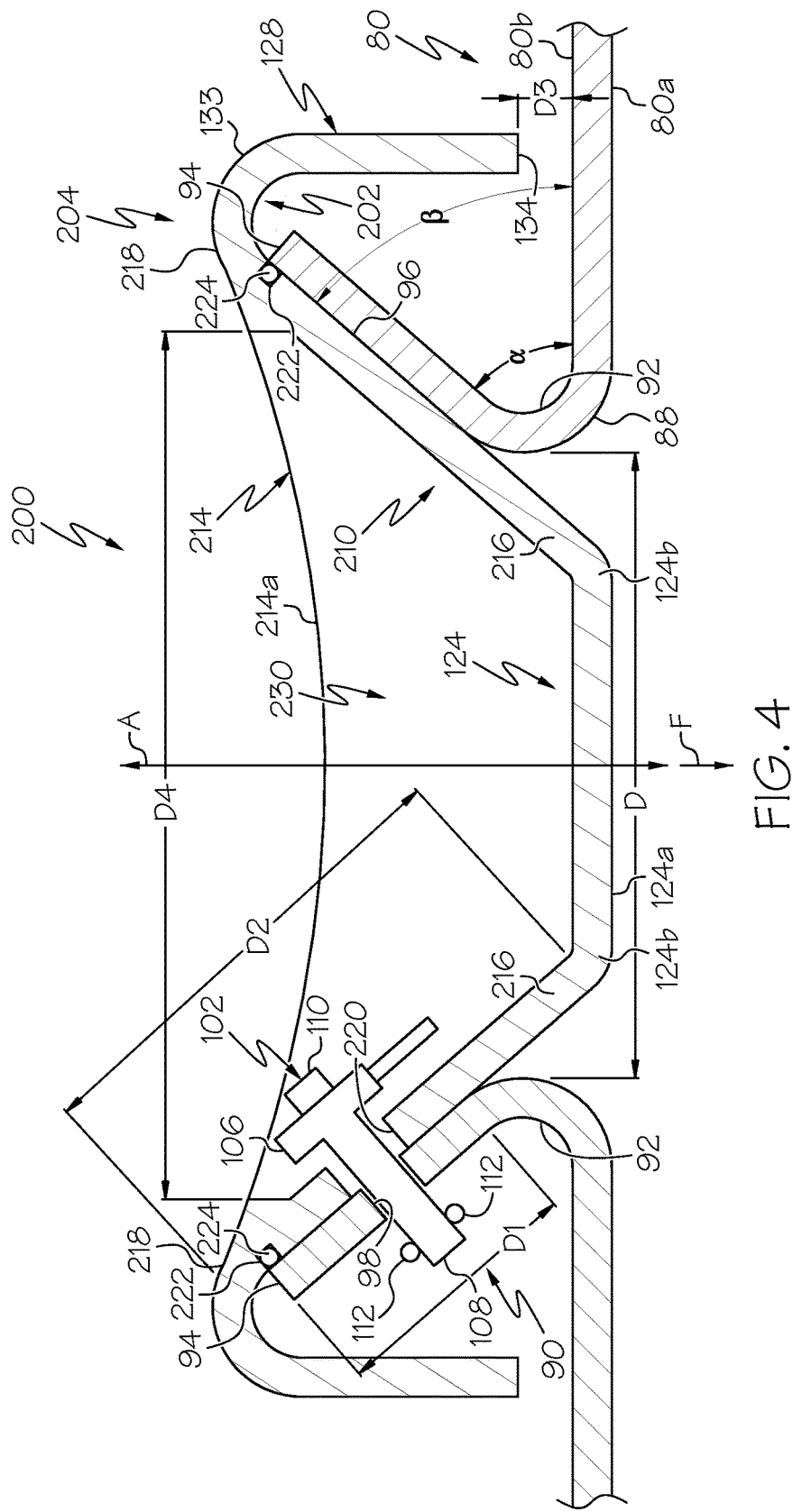
FIG. 4 is a cross-sectional view one of the access systems of FIG. 2, taken along line 4-4 of FIG. 2, which includes a vacuum sealed access passage in accordance with various embodiments.

With reference to FIG. 4, the second access system 100b is shown. It should be noted that while the lower plenum 20 is described and illustrated herein as including the first access system 100a and the second access system 100b, the lower plenum 20 can include more than one of only the first access system 100a or more than one of only the second access system 100b, if desired. Moreover, the location of the first access system 100a and the second access system 100b on the body 80 is merely exemplary. Further, as the second access system 100b can be substantially similar to the first access system 100a described with regard to FIG. 3, the same reference numerals will be used to describe the same or similar components. In addition, it should be noted that as the flange 90 of the lower plenum 20 is substantially the same as the flange of FIG. 4, the flange 90 will not be described with regard to FIG. 4 and the same reference numerals will be used to denote the various components of the flange 90, as described with regard to FIG. 3.

With continued reference to FIG. 4, the second access system 100b includes the one or more fasteners 102 and a plug 200. In one example, the one or more fasteners 102 comprise three fasteners 102, each received in a respective one of the bores 98 (FIG. 2). As discussed with regard to FIG. 3, the fasteners 102 can include, but are not limited to, a ball lock push pin or tether pin. The fasteners 102 couple or secure the plug 200 to the flange 90. As will be discussed further herein, the plug 200 is influenced by a vacuum or negative pressure source to move the plug 200 from a first, unsealed position to a second, sealed position. Stated another way, the plug 200 can be movable into the second, sealed position, in which the plug 200 seals against the sealing surface 96 via a vacuum or negative pressure. The fasteners 102 couple the plug 200 to the flange 90 such that the plug 200 remains coupled to the flange 90 in the first, unsealed position. The plug 200 is sized and shaped to have a corresponding fit with the flange 90. In other words, a first side 202 of the plug 200 is sized and shaped to fit or mate against the sealing surface 96 of the flange 90 and to be at least partially received within the passage 88. Generally, the first side 202 of the plug 200 is sized and shaped to fit against the flange 90 without forming an interference fit with the flange 90.

The plug 200 can be composed of any suitable heat resilient or heat resistant material that can be movable by a source of a vacuum or negative pressure. Generally, the source of vacuum can apply the force F directed inward toward the interior surface 80a and interior of the body 80 of the lower plenum 20. In one example, the source of vacuum can be the APU 12, which can produce a vacuum of about 0.5 pounds per square inch (psi) in certain operating conditions. Thus, the plug 200 can be composed of a heat resistant or heat resilient metal, metal alloy, polymer or composite material. For example, the plug 200 can be composed of 3-5 pre-preg plies of a composite material with fiberglass, carbon fiber or graphite fiber. In the example of the plug 200 being formed of a composite material, the plug 200 can be formed by resin transfer molding or compression molding, as known to those skilled in the art. As a further example, the plug 200 can be composed of a thin, lightweight heat resistant metal, which can be formed, shaped or cast into a shape that corresponds to the shape of the flange 90. Thus, the plug 200 can also be asymmetric with respect to the axis A. It should be noted, however, that the plug 200 can be symmetric with respect to the axis A, if desired.

The plug 200 includes the first side 202 that mates against the flange 90 and a second side 204, which is opposite the first side 202. In this example, the plug 200 is substantially conical to correspond with the shape of the flange 90, and includes the base 124, a sidewall 210, the overhang 128 and at least one stiffening rib 214. It should be noted that while the plug 200 is described and illustrated herein as being a single piece with substantially uniform thickness, the plug 200 can be composed of multiple pieces, which can be coupled together via any suitable technique, such as welding, mechanical fasteners, etc. Moreover, one or more of the base 124, the sidewall 210, the overhang 128 and the at least one stiffening rib 214 can have a material thickness that is different than another of the base 124, the sidewall 210, the overhang 128 and the at least one stiffening rib 214.

The base 124 is substantially circular and has a diameter, which is smaller than the diameter D of the passage 88, such that the base 124 can be received within a portion of the passage 88. Generally, the plug 200 is shaped such that the distalmost end 124a of the base 124 is planar to the interior surface 80a surrounding the passage 88. The sidewall 210 is coupled to the perimeter or circumference 124b of the base 124 so as to extend radially outward from the base 124. The sidewall 210 includes a first end 216, a second end 218 and one or more bores 220 defined through the sidewall 210 generally between the first end 216 and the second end 218. The sidewall 210 also includes a channel or groove 222 and a seal 224.

The first end 216 is coupled to the perimeter or circumference 124b of the base 124, and the second end 218 is coupled to the overhang 128. The first end 216 can be offset from the second end 218. In one example, the second end 218 can extend at the angle β relative to the exterior surface 80b of the body 80. Generally, the angle β can be about equal to the angle α to enable the corresponding or mating fit between the plug 200 and the flange 90. Thus, in one example, the angle β can be about 60 degrees. The sidewall 210 can extend for the distance D2, which can be greater than the distance D1 of the sealing surface 96 of the flange 90. The greater distance D2 facilitates the placement of the overhang 128 about the flange 90, as discussed with regard to FIG. 3. The first surface 202 of the plug 200 at the sidewall 210 cooperates with the sealing surface 96 to form a seal about the passage 88 when the plug 200 is in the second, sealed position.

The one or more bores 220 can correspond to the number of bores 98 associated with the flange 90. Thus, in this example, the sidewall 210 can define three bores 220. The bores 220 can receive the fastener 102 to couple the plug 200 to the flange 90. The bores 220 can be substantially coaxially aligned with the bores 98 when the plug 200 is coupled to the flange 90 in the first, unsealed position. The bores 220 can have a diameter that is slightly larger than a diameter of the bores 98 and a diameter of the fastener 102 to enable the plug 200 to move from the first, unsealed position to the second, sealed position upon the application of the vacuum or negative pressure from the source. Alternatively, the bores 98 can have a diameter that is larger than the bores 220 and the diameter of fastener 102 to permit the movement of the plug 200 relative to the flange 90. Generally, one of the bores 220 and bores 98 will have a different, larger diameter than a diameter of the fastener 102 and a diameter of the other of the bores 220 and the bores 98 to enable the movement of the plug 200. When the plug 200 is in the second, sealed position, a central axis of the bores 220 can be offset from a central axis of the bores 98. It should be noted that while the bores 220 and the bores 98 as illustrated herein as being defined through the plug 200 and flange 90 along an axis transverse to or that intersects the exterior surface 80b of the body 80, the bores 220 and the bores 98 can be orientated in any desired orientation to receive a suitable mechanism or fastening device to couple the plug 200 to the flange 90. For example, the bores 220 and bores 98 can be orientated to receive a fastener, such as a nut and bolt, spring loaded push pin, etc., that applies a perpendicular force to the plug 200 (i.e. a force perpendicular to the exterior surface 80b or a force that extends along the axis A) to hold the plug 200 in the second, sealed position at all times.

The groove 222 can be defined near the second end 218 of the sidewall 210 and can be defined in the first side 202 of the plug 200 along the sidewall 210. In one example, the groove 222 comprises an annular or circular recess defined into the first side 202, which extends along a perimeter or circumference of the sidewall 210. The groove 222 can be defined through the first side 202 by being molded into the first side 202 during the formation of the plug 200. The groove 222 can have any desired cross-sectional shape to receive the seal 224, and in one example, the groove 222 has a substantially C-shaped cross-section.

The seal 224 is received within the groove 222. The seal 224 provides an additional sealing force against the sealing surface 96 upon the application of the vacuum or negative pressure. In one example, the seal 224 comprises a rope seal, which can be composed of a heat resistant or heat resilient material, such as graphite, ceramic, silicon, etc. Alternatively, the seal 224 can comprise an elastomeric O-ring. The seal 224 generally seals against the sealing surface 96 at or near the second end 94 of the sealing surface 96 when the plug 200 is in the first, unsealed position and in the second, sealed position. In other words, the seal 224 can provide a seal for the plug 200 and the passage 88 with or without the application of the vacuum or negative pressure from the source.

The overhang 128 is coupled about a perimeter or circumference of the sidewall 210 at the second end 218 and extends from the second end 218 in a direction towards the exterior surface 80b of the body 80. The first end 133 of the overhang 128 is coupled to the second end 218 of the sidewall 210 so as to extend about the perimeter or circumference of the sidewall 210. The second end 134 of the overhang 128 extends inward from the first end 133 towards the exterior surface 80b of the body 80 and is spaced the distance D3 from the exterior surface 80b of the body 80. As discussed with regard to FIG. 3, the overhang 128 can include one or more bores, to receive one or more of the fasteners 102, such that the fasteners 102 pass through the sidewall 126, the flange 90 and the overhang 128, if desired. The overhang 128 also creates a more tortuous path in case of an event requiring containment.

The at least one stiffening rib 214 can span an inner diameter D4 of the sidewall 210. Stated another way, the at least one stiffening rib 214 can extend across an opening 230 defined by the sidewall 210. The at least one stiffening rib 214 can extend upwardly from the base 124, and can be coupled to the sidewall 210 along the second side 204 of the sidewall 210 from the first end 216 to at or near the second end 218. The at least one stiffening rib 214 can impart structural rigidity to the plug 200. In one example, the plug 200 can include two stiffening ribs 214, however, the plug 200 can include one stiffening rib 214 or need not include any stiffening ribs 214, if desired. Furthermore, the plug 104 can include the at least one stiffening rib 214, if desired. The at least one stiffening rib 214 can define a concave surface 214a, however, the at least one stiffening rib 214 can have any desired shape. The stiffening rib 214 can be integrally formed with the plug 200 or can be coupled to the base 124 and the sidewall 210 through a suitable technique, such as welding, mechanical fasteners, adhesives, etc.

In order to form the plug 104 and the plug 200, in the case of the plug 104 and 200 being composed of a composite material, multiple pre-preg plies of the composite material, such as 3-5 plies, can be manually laid up into the shape of the plug 104 or plug 200. Generally, the plug 200 can be laid up with the at least one stiffening rib 214 spanning the opening 230. Once cured, the formed plug 104 or plug 200 can be machined, such as by grinding with a circular grinding tool, until the shape of the sidewall 126 or sidewall 210 matches or corresponds with the shape of the sealing surface 96 of the flange 90. In addition, extra material, such as sacrificial plies, can be added to the sidewall 126 of the plug 104 and/or sidewall 210 of the plug 200 to provide adequate material to grind off with the grinding tool until the shape of the sidewall 126 and the sidewall 210 matches the shape of the sealing surface 96 of the flange 90. Furthermore, extra material, such as sacrificial plies, can be added to the sealing surface 96 of the flange 90 to provide adequate material to grind off with the grinding tool to assist in matching the shape of the sealing surface 96 to the shape of the sidewall 126 of the plug 104 and the sidewall 210 of the plug 200. While the plug 200 is formed, the groove 222 can be molded into the first side 202 along the sidewall 210 and with the plug 200 formed, the seal 224 can be positioned within the groove 222. Alternatively, the plug 104 and/or the plug 200 can be formed through resin transfer molding or compression molding as known to one skilled in the art.

With the plug 104 and/or plug 200 formed, the plug 104 and/or plug 200 can be coupled to the flange 90. With regard to the plug 104, the plug 104 can be coupled to the flange 90 such that the first side 120 can be coupled to the sealing surface 96 of the flange 90, and the base 124 is positioned at least partially within the passage 88. Stated another way, the plug 104 can be coupled to the flange 90 such that the sidewall 126 is coupled to the sealing surface 96. Generally, the plug 104 can be positioned about the flange 90 such that the overhang 128 substantially circumferentially surrounds the flange 90, but is spaced apart from the exterior surface 80b via the distance D3. With the bores 132 coaxially aligned with the bores 98, the fasteners 102 can be inserted through the bores 132 and bores 98. With the fasteners 102 inserted into the bores 132 and bores 98, the actuator 110 of each of the fasteners 102 can be actuated to deploy the balls 112 and couple the plug 104 to the flange 90.

With regard to the plug 200, the plug 200 can be coupled to the flange 90 such that the first side 202 can be coupled to the sealing surface 96 of the flange 90 and the seal 224 is coupled to the sealing surface 96 near or at the second end 94 of the flange 90. In other words, the sidewall 210 can be coupled to the sealing surface 96. With the sidewall 210 coupled to the sealing surface 96, the base 124 can be positioned at least partially within the passage 88. Generally, the plug 200 can be positioned about the flange 90 such that the overhang 128 substantially circumferentially surrounds the flange 90, but is spaced apart from the exterior surface 80b via the distance D3. With the bores 220 coaxially aligned with the bores 98, the fasteners 102 can be inserted through the bores 220 and bores 98. With the fasteners 102 inserted into the bores 220 and bores 98, the actuator 110 of each of the fasteners 102 can be actuated to deploy the balls 112 and couple the plug 200 to the flange 90.

With the first access system 100a and/or the second access system 100b coupled to the flange 90, the plug 104 and plug 200 can be in the first, unsealed position in the absence of a vacuum or negative pressure. Once a vacuum or negative pressure is applied, such as by the operation of the APU 12 in certain operating conditions, the plug 104 and the plug 200 can move from the first, unsealed position to the second, sealed position. The plug 104 can move from the first, unsealed position to the second, sealed position due to the difference between the diameter of the bore 132, the bore 98 and the diameter of the fastener 102. In this regard, as the diameter of the bore 132 or the diameter of the bore 98 can be greater than the diameter of the fastener 102, the plug 104 can move relative to the flange 90 into the second, sealed position upon the application of the negative pressure. Similarly, the plug 200 can move from the first, unsealed position to the second, sealed position due to the difference between the diameter of the bore 220, the bore 98 and the diameter of the fastener 102. In this regard, as the diameter of the bore 220 or the diameter of the bore 98 can be greater than the diameter of the fastener 102, the plug 200 can move relative to the flange 90 into the second, sealed position upon the application of the negative pressure.

In the second, sealed position, the plug 104 and plug 200 provide a seal over the passage 88 without requiring the use of an elastomeric gasket. Moreover, by coupling the fasteners 102 to the flange 90, bores do not need to be defined through the body 80 of the lower plenum 20 to couple the first access system 100a and/or the second access system 100b to the lower plenum 20. In addition, the use of the overhang 128 to wrap around an outer circumference of the flange 90 further protects the flange 90 during an a containment event by enabling air to act as an insulator between the flange 90 and the overhang 128 of the plug 104 and plug 200. The overhang 128 also creates a more tortuous path in case of an event requiring containment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An access system for a passage defined in a component, the passage surrounded by a flange, the access system comprising:
    a plug adapted to be coupled to the flange of the component to seal the passage, the plug including a sidewall and an overhang coupled to the sidewall, the overhang configured to substantially surround at least a portion of the flange, the plug movable between a first, unsealed position and a second, sealed position upon the application of a force,
    wherein the force is a vacuum.

2. The access system of claim 1, wherein the plug includes a base, and the sidewall extends radially outward from the base.

3. The access system of claim 1, wherein the plug is substantially conical.

4. The access system of claim 3, wherein the sidewall of the plug defines an opening and at least one stiffening rib spans the opening.

5. The access system of claim 1, wherein the sidewall defines at least one bore, and the access system further comprises at least one fastener received in the bore, the at least one fastener configured to couple the plug to the flange.

6. The access system of claim 1, wherein the sidewall includes a first end and a second end, and the second end is offset from the first end.

7. The access system of claim 1, wherein at least one channel is defined in the sidewall and the access system further comprises a seal received within the channel.

8. The access system of claim 1, wherein the component is a duct associated with an auxiliary power unit.

9. A duct, comprising:
    a body defining a passage and a flange, the flange extending substantially about a perimeter of the passage and defining a first bore;
    an access system for sealing the passage, the access system including:
        a plug coupled to the flange for sealing the passage, the plug including a base and a sidewall, the sidewall defining a second bore; and
        a fastener received within the first bore and the second bore to couple the plug to the flange,
    wherein the plug is movable between a first, unsealed position and a second, sealed position upon the application of a force to seal the passage, and the plug further comprises an overhang coupled to the base so as to extend substantially about a perimeter of the flange.

10. The duct of claim 9, wherein the flange extends outwardly from the body at an angle, and the sidewall extends from the base at about the angle.

11. The duct of claim 9, wherein the plug is asymmetric relative to an axis defined through the passage.

12. The duct of claim 9, wherein the sidewall defines a channel and a seal is received within the channel and contacts the flange.

13. The duct of claim 9, wherein the force is a vacuum.

14. The duct of claim 13, wherein the duct is a portion of an inlet duct associated with an auxiliary power unit of a vehicle, and the auxiliary power unit is the source of the vacuum.

15. A duct, comprising:
    a body defining a passage and a flange, the flange extending outwardly from the body about a circumference of the passage;
    an access system for sealing the passage, the access system including:
        a plug coupled to the flange for sealing the passage, the plug including a sidewall that extends radially outward from a base, with the base received at least partially within the passage and an overhang coupled to the sidewall to extend about a perimeter of the flange,
    wherein the plug is movable between a first, unsealed position and a second, sealed position upon the application of a force to seal the passage, and the sidewall defines a channel and a seal is received within the channel and contacts the flange.

16. The duct of claim 15, wherein the force is a vacuum.

17. The duct of claim 15, wherein the flange defines a first bore, the sidewall of the plug defines a second bore, and the access system further comprises a fastener received in the first bore and the second bore to couple the plug to the flange.

* * * * *